United States Patent [19]

Taylor et al.

[11] Patent Number: 4,812,994

[45] Date of Patent: Mar. 14, 1989

[54] POSTAGE METER LOCKING SYSTEM

[75] Inventors: Michael P. Taylor; Wojciech M. Chronsny, both of Norwalk, Conn.

[73] Assignee: Pitney Bowes Inc., Stamford, Conn.

[21] Appl. No.: 124,392

[22] Filed: Nov. 20, 1987

Related U.S. Application Data

[63] Continuation of Ser. No. 762,989, Aug. 6, 1985, abandoned.

[51] Int. Cl.[4] .......................... G06F 7/04; G06F 15/20

[52] U.S. Cl. .......................... 364/464.02; 340/825.31; 364/200

[58] Field of Search ................ 364/464, 200 MS File, 364/900 MS File; 340/825.31, 825.32, 825.33

[56] References Cited

U.S. PATENT DOCUMENTS

| | | | |
|---|---|---|---|
| 3,978,457 | 8/1976 | Check, Jr. et al. | 364/200 |
| 4,097,923 | 6/1978 | Eckert, Jr. et al. | 364/900 |
| 4,104,721 | 8/1978 | Markstein et al. | 364/200 |
| 4,253,157 | 2/1981 | Kirschry et al. | 364/900 |
| 4,253,158 | 2/1981 | McFiggans | 364/900 |
| 4,302,821 | 11/1981 | Eckert et al. | 364/464 |
| 4,376,299 | 3/1983 | Rivest | 364/900 |
| 4,442,501 | 4/1984 | Eckert et al. | 364/900 |
| 4,447,890 | 5/1984 | Duwel et al. | 364/900 |
| 4,584,648 | 4/1986 | Slugos | 364/464 |
| 4,685,055 | 8/1987 | Thomas | 340/825.31 X |

OTHER PUBLICATIONS

"Secure Method to Set & Test System Administrator Password", by S. Matyas; IBM Technical Disclosure Bulletin, vol. 19, No. 10, Mar. 1977, pp. 3800–3802.

*Primary Examiner*—Parshotam S. Lall
*Assistant Examiner*—Edward R. Cosimano
*Attorney, Agent, or Firm*—Donald P. Walker; David E. Pitchenik; Melvin J. Scolnick

[57] ABSTRACT

A postage metering lock-out security system is disclosed for use with electronic postage meters and for use with a postage metering system that operates in conjunction with a users computer and printer that prints postal value. With the lock out security system, in order for postage to be printed, the postage-metering control unit must receive a valid signal or password. The password may also be used to identify a particular user for accounting purposes. The metering system can also be provided with an internal clock so that metering may take place only within circumscribed times. An additional security feature is provided by an automatic call-back for postage recharging in order to assure that the meter is physically located at the appropriate location.

22 Claims, 5 Drawing Sheets

POSTAGE METER LOCKING SYSTEM

This application is a continuation of application Ser. No. 762,989, filed Aug. 6, 1985, now abandoned.

BACKGROUND OF THE INVENTION

The invention relates to electronic postage meters and to electronic postage metering accounting units designed for operation in conjunction with a users' computer and printer. As used herein the term electronic postage meter also refers to other similar meters, such as parcel registers and tax meters, which dispense and account for value.

Electronic postage meters are known and described for example in U.S. Pat. No. 3,978,457 to Check et al. Electronic postage meters which utilize the customer's computer and printer are described for example, in copending application Ser. No. 724,372 of Muller filed Apr. 17, 1985 and in a copending application by R. Sansone et al. entitled POSTAGE AND MAILING INFORMATION APPLYING SYSTEM filed concurrently herewith.

In postage meters, the need for security is absolute. The reason for the absolute security requirement is that a postage meter is printing value, and unless security measures are taken, one would be able to print unauthorized postage, thereby defrauding the U.S. Postal Service. Most of the security measures taken are of a physical nature, but recently there have been suggestions for use of encryption to ensure that a postage indicia is valid.

In these meters, however, the security efforts have been directed mainly to preventing fraud on the Postal Service. There has been no consistent attempt to provide security for the customer who is authorized to use the postage meter to enable him to prevent unauthorized access for the use of the postage meter except by use of a lock and key to turn on the meter. Typically anyone who has physical access to the operating postage meter can meter postage for personal or unauthorized use at the expense of the authorized customer who has paid for the postage.

SUMMARY OF THE INVENTION

To alleviate the lack of security for the mail user and in accordance with the invention, a security means is provided to lockout postage meter operation unless it is enabled by the use of a particular word or identifying signal and/or only during particular preselected time intervals to enable the customer to prevent unauthorized access to the electronic postage meter funds. In accordance with a further aspect of the invention, the funding of the meter is enabled only upon the communication being initiated by a control center in order to ensure that funds transferred from the control center are transferred at the behest of the actual authorized user of the meter at his physical location. For best results, only one person at a facility will be able to request the transfer of funds and to select the access words and times of use.

Further features and advantages of the method and apparatus in accordance with the invention will become more apparent from the description ofthe drawing.

DETAILED DESCRIPTION OF THE PREFERRED EMBODIMENT

Figure 1:
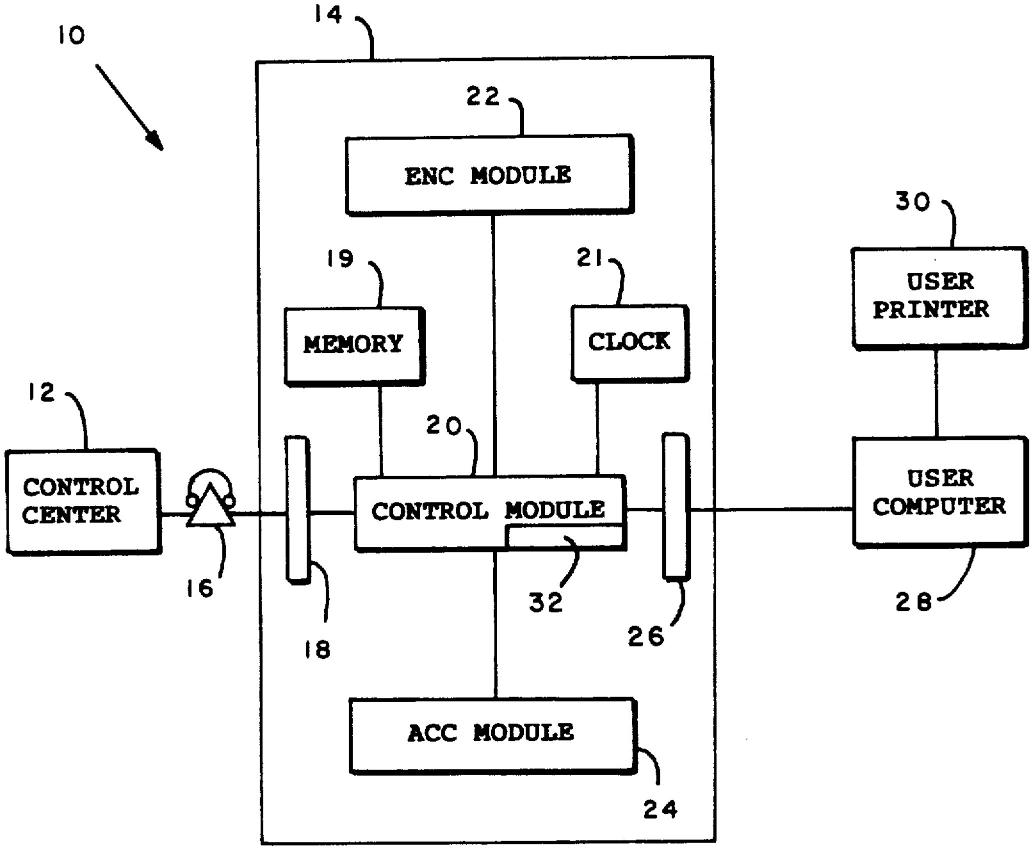
FIG. 1 shows a block diagram of a system which incorporates the instant invention.

Referring initially to FIG. 1, a postage and mailing information applying system which may practice the present invention is shown generally at 10 and includes a control center 12 and an accounting unit 14 that are in communication with one another through a communicating device such as a telephone 16, facsimile machine, telex machine, or the like.

Located within the accounting unit 14 is a modem 18, or converter, which communicates with the telephone 16 and a control module 20 of the accounting unit, which control module 20 may be a CPU processor such as an Intel 8081, available from Intel, Santa Clara, Calif., operating under a suitable control program. The control module includes a ROM 19 either integral or in connection therewith (as shown) in which the control program resides. In communication with the control module 20 is an encryption module 22 as well as an accounting module 24. A suitable encryption module is described in the copending application of R. Sansone et al. The accounting module 24 includes a random access memory that incorporates the ascending and descending registers. The RAM may be of the CMOS type including a battery-backup so that the register data may be retained or the accounting module may incorporate a non volatile memory for permanent memory and further control to enable transfer of accounting data to permanent memory registers as is well known in the art.

As is known in postage meters, the ascending register is the register that records the amount of postage that is dispensed or printed on each transaction and the descending register is that which records the value or amount of postage that may be dispensed and decreases from that amount as postage is printed. Another modem 26 within the accounting unit 14 provides communication between the control module 20 and a user computer 28. It will be appreciated that such modem 26 may be replaced by direct communication between the computer 28 and the accounting unit 14 through parallel or serial input/output buffers or the like. It will be further understood that the modem 18 is optional and communication may be established through the user computer or by physically carrying the accounting unit 14 to the control center 12.

The user computer may be any type of computer that has input/output, logic, and memory as, for example, a personal computer such as the IBM AT available from IBM, Armonk, N.Y.. Connected to the user computer 28 is a printer 30. The printer may be of any type that is capable of printing individual alpha numerics and bar code.

While the invention is described with respect to the foregoing illustrated system, it will be understood that the invention may also be incorporated in a conventional electronic postage meter having an integral printer.

In the block diagram shown in FIG. 1, the control center 12, which may be a Post Office or other data center such as employed in remote meter recharging operations as taught, for instance, in U.S. Pat. No. 4,097,923 to Eckert, incorporated herein by reference, is a source of postage value. The postage meter may be charged remotely upon a customer number being provided to the Postal Service. The Postal Service or data center, in turn, will provide postage value that is automatically inputted to the customer's postage meter, or in this case the accounting unit 14. In the system of FIG. 1, the accounting unit 14 is a secure unit such that tampering by physical, electronic or magnetic means in inhibited. Security features such as shielding, breakaway bolts and the like are well known and the means for securing the accounting unit will not be described.

As detailed below in accordance with the invention the accounting unit 14 is accessible by the user computer only upon a proper code or password being received by the control module 20 of this accounting unit 14 from the user computer 28. As brought out in the copending application to R. Sansone et al., previously referenced, postage to be printed by the printer 30 includes an encrypted string that is generated by the encryption module 22. Such encryption may be based upon any recognized code such as DES or RSA. Upon the appropriate information being supplied to the accounting unit 14 the encryption module 22 would generate an encrypted string to be printed upon a label or mailpiece. This supplied information could include a transaction numer, the customer number, the value of postage and the like. It will be appreciated that in conventional electronic postage meters, there is no encryption module.

In accordance with the invention, a security module 32 which conveniently may be conventional EPROM having a program residing therein accessed by the microprocessor of the control module 20 is provided to allow the owner and authorized users to enable the printing of postage and to prevent all others from fraudulent use of the accounting unit or meter portion 14. It will be understood that the security module may, of course, reside as an integral part of the control module 20, the encryption module 22, or the ACC module 24. It will be further appreciated that the security program module may suitably be a resident part of the microprocessor control program of a conventional electronic postage meter which is accessed by the microprocessor. It is further contemplated that the security module 32 may have its own microprocessor operation for communicating in known manner with the control module 20.

Figure 2:
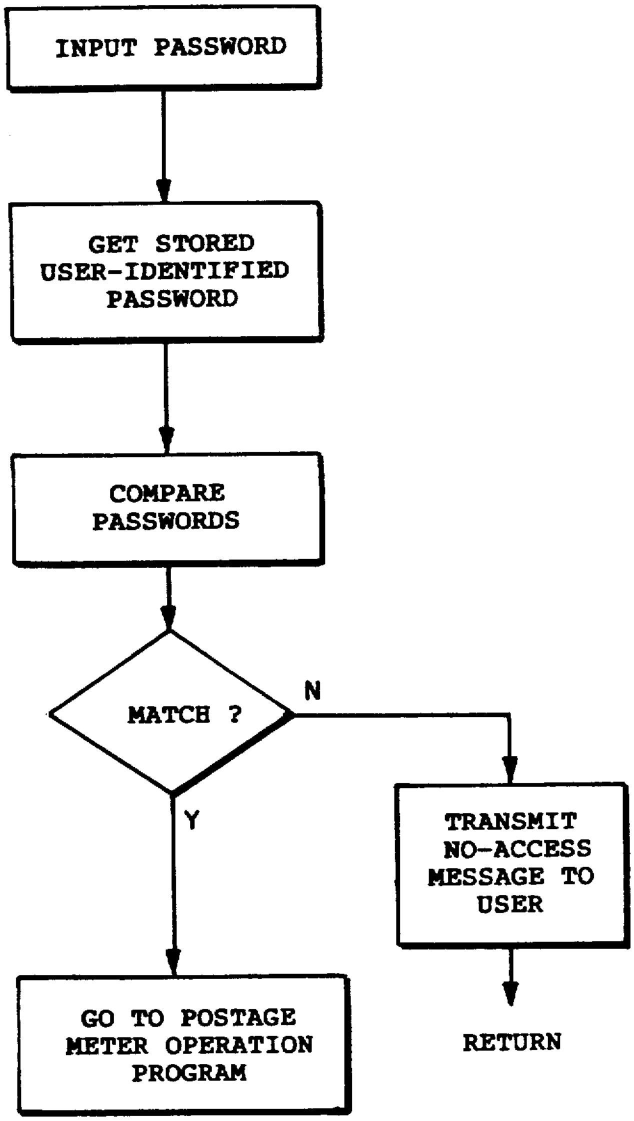
FIG. 2 is a flow chart illustrating a method in accordance with the invention of enabling access to the electronic postage meter.

Referring now to FIG. 2, there is shown a flow chart of a way of implementing authorized-user-only access to the meter. The term "user" as defined herein is a customer or one designated by the customer, i.e. someone other than a service person, meter manufacturer, or data center representative. As illustrated in the flow chart, in order to enable the pringing of postage, an input password or user identifying signal is provided. The user keys in a user identifying signal (code) or a user-generated password from computer 28 through modem 26 (or from the keyboard of the electronic postage meter) which password is compared with a word previously stored in the security module. If there is a match, the program returns control to the control module to continue metering operation and otherwise permit use of the accounting unit 14. If there is no match, the program will not enable the encryption module and will inform the user's computer via the modem 26 that an invalid code has been entered. In a conventional electronic postage meter, the integral printer may be inhibited from imprinting the indicia. It will be understood that the user's password may be communicated to the security module by means of a magnetic tape reader, card reader, or bar code reader instead of the user's keying the password through the keyboard. It will be appreciated that more than one password could be required if desired and that the user's password could be encrypted as part of the encrypted string to enable the particular user to be identified. The user's password will also enable the computer and/or meter portion to keep track of a particular user's postage usage for accounting purposes.

Figure 3A:
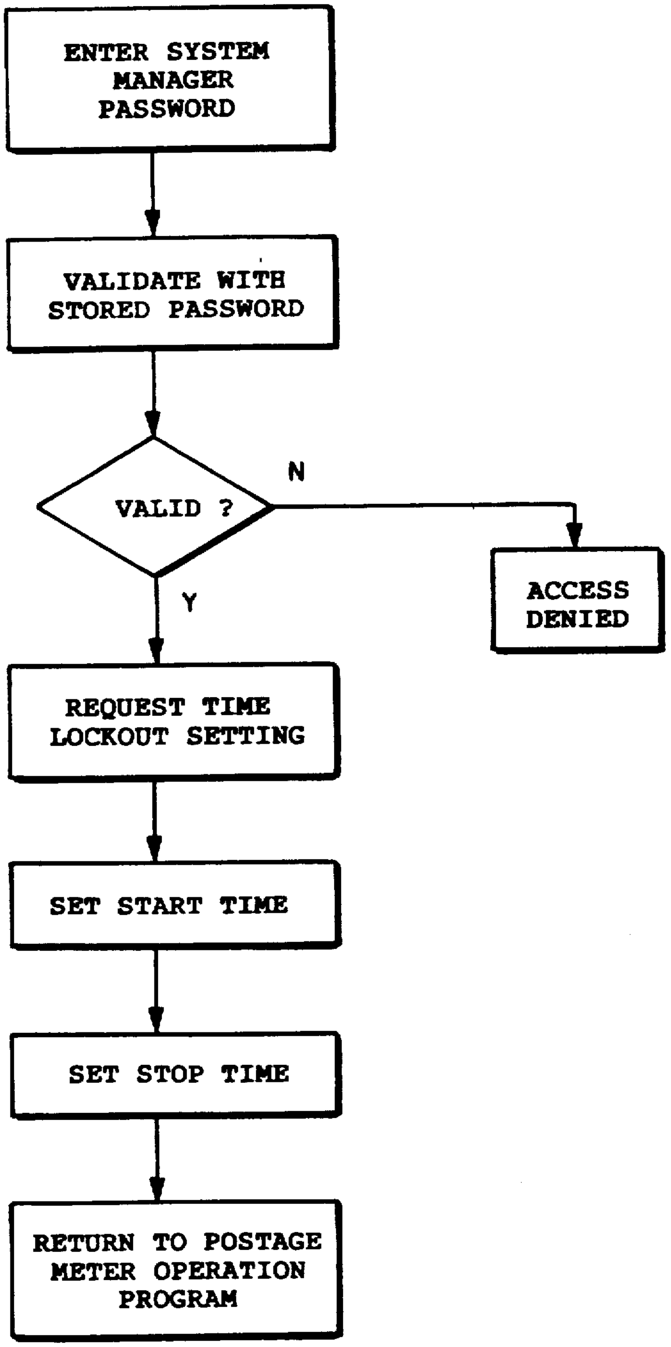
FIGS. 3A and 3B comprise flow charts illustrating another method of enabling access.
Figure 3B:
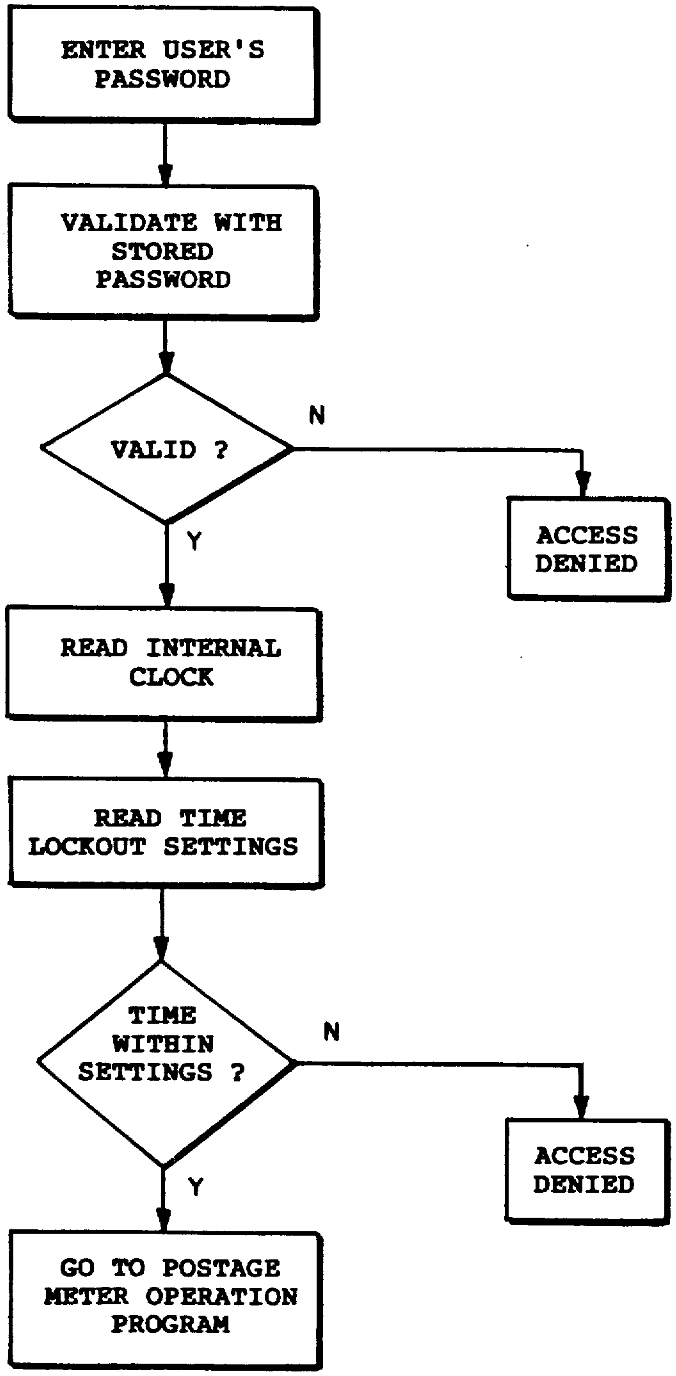

As shown in the flow charts of FIGS. 3A and 3B, the authorized meter user may also set time-of-day limits on the use of the meter to prevent, for example, after work-hours access to the meter. Preferably, a user-identifying password known only to one person described herein as the System Manager will enable access to the time limit selection program shown in the flow chart of FIG. 3A. It will be appreciated that while less desirable from a security standpoint, if desired, any user may be given the system manager password to allow the user to change the preset time limits. It will be understood that the System Manager is not limited to simply setting the time limits. It is also contemplated that the System Manager's access password may encompass further user setting functions such as setting of fund authorization limits for a given user password, for example, or for setting the time limits for the use of a particular user identifying password to enable better user control and accounting for the printing of postage or for changing the user's password.

In view of the above discussion, the flow chart of FIG. 3A is essentially self-explanatory. The system manager inputs his identifying password (code) to enter the setting program. As discussed above, with reference to FIG. 2, if the user password and a stored code match, use of the accounting unit 14 is permitted. Thus, as shown in FIG. 3A if the system manager password and a system manager stored code match, the password is identified as being valid. On the other hand, if the system manager password and the stored code do not match, the password is identified as not valid. Assuming invalidity, across to the accounting unit 14 for use thereof is denied, whereas assuming validity, the system manager password user may request access to the aforesaid time limit selection program for inputting time-of-day lock-out settings which limit the time of day during which another password user may use the accounting unit. Thus the time limit selection program includes structure for permitting pre-setting the time of day during which another password is valid for permitting use of the accounting unit. Assuming the time limit selection program has been called up, then, as shown in FIG. 3A, the system manager password user sets the start and then stop limits selecting the time of day during which another password may be used. After the start and stop time limits are inserted, and the program returns control of the accounting unit 14 to the control module 24 for operation of the postage metering program. Other limits may be accessed and set in a similar manner to that shown in FIG. 3A for the time limits. Thus, rather than accessing the aforesaid time limit selection program and setting the time limits for a given password user, the system manager password user may access a funds authorization program for presetting a limit value of postage that may be dispensed when there is a match between another password and another stored code. Or, the system manager password user may access a program for identifying a given password which, when used, will cause the accounting unit 14 to separately account for postage amounts dispensed when the give password is in use.

As shown in FIG. 3B, when another user logs onto the meter by inputting his password, i.e. another identifying signal, and as described with respect to FIGS. 2 and 3A, the password is not valid, access is denied, whereas assuming the password is valid, then, the program reads the time of day of the inputting of the user's identifying signal which is obtained from internal clock 21 shown in FIG. 1 and the preselected limits stored in the security module and compares the same to determine whether or not the meter access is within the appropriate time setting or limits. If it is not, access is denied, whereas if it is valid, the meter program control proceeds to normal operation. Thus meter operation is enabled only at times between the preset limits.

Figure 4:
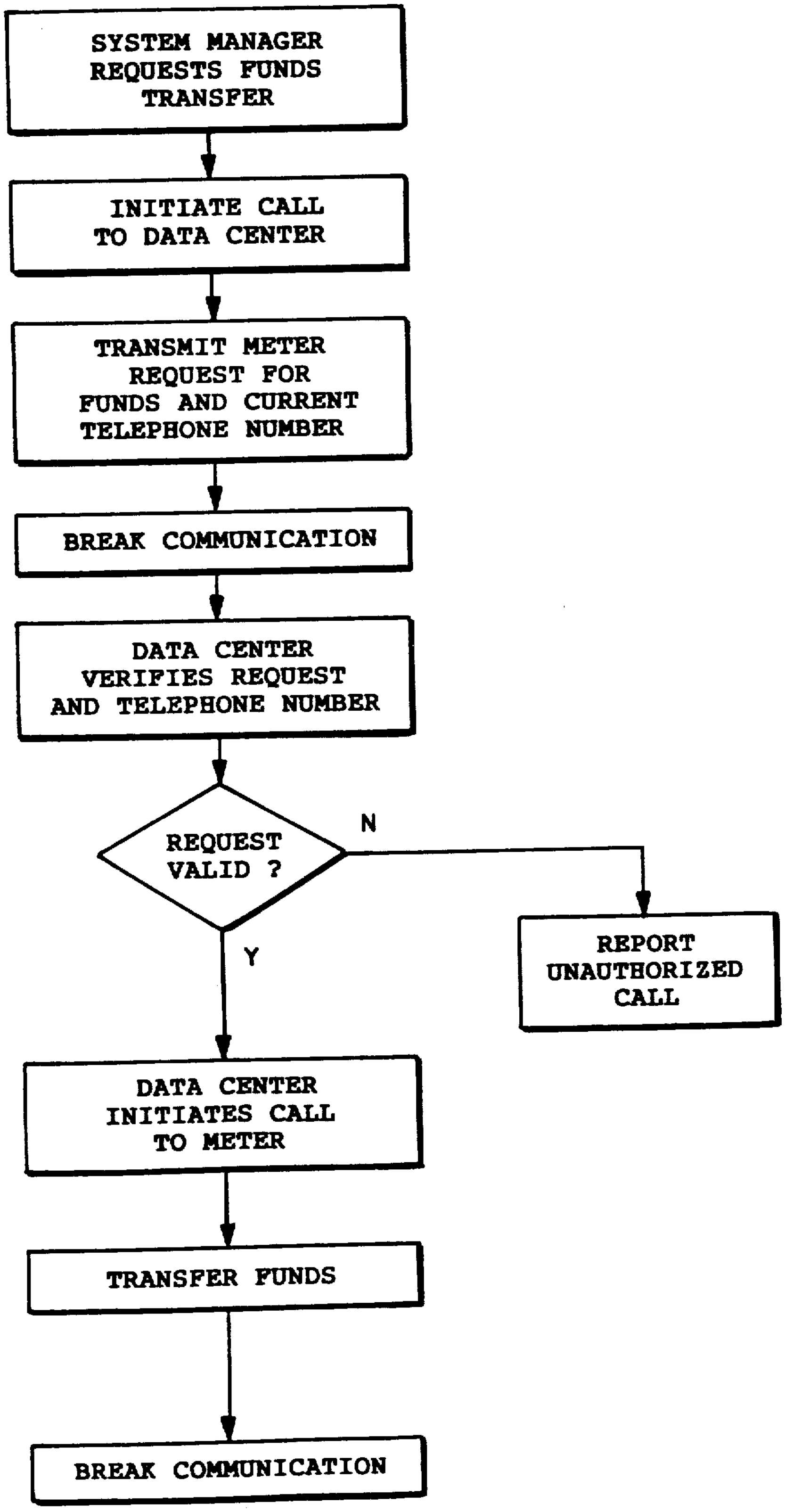
FIG. 4 is a flow chart illustrating the call back method of meter recharging in accordance with the invention.

The flow chart of FIG. 4 shows a further security feature in recharging the funds of the meter. The authorized user, again preferably only one individual, the System Manager who has knowledge of the appropriate password to gain access to the funds transfer program, initiates a transfer funds request. FIG. 4 thus assumes that the system manager user's password has been validated, as hereinbefore discussed in connection with FIG. 2, and that a request for funds transfer has been made. In accordance with the invention, once entered the meter or accounting unit 14 initiates a phone call to the control center 12 through the device 16. The control center is then furnished with any desired meter identifying information including the meter's current telephone number. The communication connection is then broken by the control center. Whereupon, the control center 12 initiates a communication to the accounting unit 14, and verifies the request and phone number of the meter. The information is compared with that stored in the security module to determine whether the request is a valid request. If the request is determined to be a valid request then the fund transfer operation is performed in conventional manner as described, for instance, in U.S. Pat. No. 4,097,923 to Eckert.

If the request is determined to be invalid, the control center 12 receives a signal indicative that there was an unauthorized request for funds transfer and the unauthorized call is reported. Thereafter, the control or data center initiates communication with the accounting or metering unit, followed by transferring funds to the same and then breaking off communications therewith.

What is claimed is:

1. In a postage metering system including printing means, accounting means including means for controlling the printing means, the accounting means including means for storing a postage value which may be dispensed, and the accounting means including means for decreasing the stored value by respective amounts corresponding to postage dispensed, an improvement for securing the accounting means against unauthorized use, the improvement comprising:

a. means for communicating with said accounting means, said communicating means including means for inputting at least one user identity password to the accounting means; and
b. said accounting means including a secure memory, said memory having stored therein at least one user identity code, said accounting means including means for comparing said at least one code and said at least one password, said accounting means including means for permitting use thereof if the comparison indicates that said at least one code and said at least one password match, and said accounting means including means for preventing use thereof if the comparison indicates that said at least one code and said at least one password do not match.

2. The improvement according to claim 1, wherein the accounting means includes a time of day clock, said at least one code including a plurality of codes, said at least one password including a plurality of passwords, one of said codes being a system manager identify code, one of said passwords being a system manager password, the accounting means including a time limit selection program usable only when there is a match between the system manager code and system manager password, and the time limit selection program including means for permitting pre-setting the time of day during which another of said passwords is valid for permitting use of the accounting means.

3. The improvement according to claim 1, wherein said at least one code includes a plurality of codes, said at least one password including a plurality of passwords, one of said codes being a system manager identity code, one of said passwords being a system manager password, the accounting means including a funds authorization program usable only when there is a match between the system manager code and system manager password, and the funds authorization program including means for permitting pre-setting a limit value of postage that may be dispensed when there is a match of another of said codes and another of said passwords.

4. The improvement according to claim 1, wherein said postage metering system includes a postage meter, and said postage meter including said printing means and said accounting means.

5. The improvement according to claim 1, wherein said accounting means includes means for separately accounting for postage amounts dispensed when a given password is in use.

6. In a postage metering system including printing means, accounting means including means for controlling the printing means, the accounting means including means for storing a postage value which may be dispensed, and the accounting means including means for decreasing the stored value by respective amounts corresponding to postage dispensed, a method for securing the accounting means against unauthorized use, the method comprising the steps of:

a providing a secure memory:
b. storing in said memory at least one user identify code;
c. inputting to said accounting means at least one user password;
d. comparing said at least one code and said at least one password;
e. permitting use of said accounting means if said comparison indicates that said at least one code and said at least one password match; and
f. preventing use of said accounting means if said comparison indicates that said at least one code and said at least one password do not match.

7. The method according to claim 6 including the steps of:

g. providing a time of day clock;

h. programming said accounting means for permitting use thereof only during a preselected time of day if there is a match between a given code and a given password; and i. programming said accounting means to permit preselecting the time of day if there is a match between a predetermined code and a predetermined password.

8. The method according to claim 6 including the steps of:

g. programming said accounting means for permitting presetting a limit on the value of postage that may be dispensed if there is a match between a given code and a given password; and h. programming said accounting means to permit presetting said limit if there is a match between a predetermined code and a predetermined password.

9. The method according to claim 6 including the step of providing a postage meter including said printing means and said accounting means.

10. In a postage metering system including printing means, accounting means including means for controlling the printing means, the accounting means adapted to communicate with a remotely located data center for receiving therefrom a postage value which may be dispensed, the accounting means including means for storing the postage value, and the accounting means including means for decreasing the stored value by respective amounts corresponding to postage dispensed, an improvement for securing the accounting means against unauthorized use, the improvement comprising:

a. means for communicating with said accounting means, said communicating means including means for inputting at least one user identify password to the accounting means; and b. said accounting means including a memory, said memory having stored therein at least one user identity code, said accounting means including means for comparing said at least one code and said at least one password, said accounting means including means for permitting use thereof if the comparison indicates that said at least one code and said at least one password match, and said accounting means including means for preventing use thereof if the comparison indicates that said at least one code and said at least one password do not match.

11. The improvement according to claim 10, wherein the accounting means includes a time-of-day clock, said at least one code including a plurality of codes, said at least one password including a plurality of passwords, one of said codes being a system manager code, one of said passwords being a system manager password, the accounting means including a time limit selection program usable only when there is a match between the system manager code and system manager password, and the time limit selection program including means for permitting pre-setting the time of day during which another of said passwords is valid for permitting use of the accounting means.

12. The improvement according to claim 10, wherein said at least one code includes a plurality of codes, said at least one password including a pluralllity of passwords, one of said codes being a system manager code, one of said passwords being a system manager password, the accounting means including a funds authorization program usable only when there is a match between the system manager code and system manager password, and the funds authorization program including means for permitting pre-setting a limit value of postage that may be dispensed when there is a match of another of said codes and another of said passwords.

13. The improvement according to claim 10, wherein said postage metering system includes a postage meter, and said postage meter including said printing means and said accounting means.

14. The improvement according to claim 10, wherein said communicating means includes a modem, and said accounting means including means for communicating with said data center via said modem.

15. The improvement according to claim 10, wherein said communicating means includes a computer, and said accounting means including means for communicating with said data center via said computer.

16. The improvement according to claim 10, wherein said accounting means includes means for separately accounting for postage amounts dispensed when a given password is in use.

17. In a postage metering system including printing means, accounting means including means for controlling the printing means, the accounting means adapted to communcate with a remotely located data center for receiving therefrom a postage value which may be dispensed, the accounting means including means for storing the postage value, and the accounting means including means for decreasing the stored value by respective amounts corresponding to postage dispensed, a method for securing the acccounting means against use by authorized users, the method comprising the steps of:

a. storing in said accounting means at least one user identity code;

b. inputting to said accounting means at least one user password;

c. comparing said at least one code and said at least one password;

d. permitting use of said accounting means if said comparison indicates that said at least one code and said at least one password match; and e. preventing use of said accounting means if said comparison indicates that said at least one code and said at least one password do not match.

18. The method according to claim 17 including the steps of:

f. providing a time-of-day clock;

g. programming said accounting means for permitting use thereof only during a preselected time of day if there is a match between a given code and a given password; and h. programming said accounting means to permit preselected the time of day if there is a match between a predetermined code and a predetermed password.

19. The method according to claim 17 including the steps of:

f. programming said accounting means for permitting presetting a limit on the value of postage that may be dispensed if there is a match between a given code and a given password; and g. programming said accounting means to permit presetting said limit if there is a match between a predetermined code and a predetermined password.

20. The method according to claim 17 including the step of providing a postage meter including said printing means and said accounting means.

21. The method according to claim 17 including the step of communicating with said accounting means, and said communicating step including said inputting step.

22. The method according to claim 17 including the step of accounting for all postage amounts dispensed when a given password is in use.

* * * * *